(12) United States Patent
Beveridge et al.

(10) Patent No.: US 9,578,032 B2
(45) Date of Patent: Feb. 21, 2017

(54) APPLICATION PUBLISHING USING MEMORY STATE SHARING

(71) Applicant: VMware, Inc., Palo Alto, CA (US)

(72) Inventors: Daniel James Beveridge, Apollo Beach, FL (US); Blake Watts, St. George, UT (US); Per Olov Larsson, London (GB); Banit Agrawal, Sunnyvale, CA (US); Hui Li, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 97 days.

(21) Appl. No.: 14/615,374

(22) Filed: Feb. 5, 2015

(65) Prior Publication Data
US 2016/0055017 A1    Feb. 25, 2016

Related U.S. Application Data

(60) Provisional application No. 62/041,046, filed on Aug. 23, 2014.

(51) Int. Cl.
  *G06F 9/455*   (2006.01)
  *H04L 29/06*   (2006.01)
  *G06F 9/50*    (2006.01)
  *G06F 9/52*    (2006.01)

(52) U.S. Cl.
  CPC ........... *H04L 63/10* (2013.01); *G06F 9/45558* (2013.01); *G06F 9/5016* (2013.01); *G06F 9/52* (2013.01); *G06F 2009/45575* (2013.01); *G06F 2009/45583* (2013.01)

(58) Field of Classification Search
  None
  See application file for complete search history.

(56) References Cited

U.S. PATENT DOCUMENTS

| | | | | |
|---|---|---|---|---|
| 2006/0005189 A1* | 1/2006 | Vega | ............... | G06F 9/4856 718/1 |
| 2006/0195715 A1* | 8/2006 | Herington | ............ | G06F 9/5077 714/4.2 |
| 2008/0163210 A1* | 7/2008 | Bowman | ............ | G06F 9/4843 718/1 |
| 2012/0331465 A1* | 12/2012 | Tanikawa | ............ | G06F 9/5077 718/1 |

FOREIGN PATENT DOCUMENTS

| | | |
|---|---|---|
| EP | 1 939 742 | 7/2008 |
| WO | WO 99/44334 | 9/1999 |

OTHER PUBLICATIONS

International Search Report and Written Opinion received in International Patent Application No. PCT/US2015/046179, filed Aug. 20, 2015. Received Nov. 25, 2015. 13 pages.

* cited by examiner

*Primary Examiner* — Dong Kim

(57) ABSTRACT

Examples described herein enable memory state sharing among a plurality of virtual machines (VM) including a parent VM and a child VM. A request for memory state sharing between the parent VM and the child VM is received, and the parent VM is suspended. The child VM resumes execution of one or more suspended applications. In one example, the child FM is forked with pre-loaded, suspended applications from the parent VM. Aspects of the disclosure offer a high performance, resource efficient solution that outperforms traditional approaches in areas of software compatibility, stability, quality of service control, re-source utilization, and more.

22 Claims, 8 Drawing Sheets

APPLICATION PUBLISHING USING MEMORY STATE SHARING

CROSS-REFERENCE TO RELATED APPLICATIONS

This application claims the benefit of U.S. Provisional Patent Application Ser. No. 62/041,046, filed Aug. 23, 2014 entitled "Application Publishing Using Memory State Sharing", which is incorporated by reference herein in its entirety.

BACKGROUND

Providing access to legacy applications from mobile devices continues to gain importance. Traditional application remoting approaches leverage Remote Desktop Services (RDS) technology such as Citrix XenApp brand application virtualization product. (Remote Desktop Services and RDS are trademarks of Microsoft Corporation, and Citrix XenApp is a trademark of Citrix Systems). That is, current application publishing approaches rely on 'server based computing' technology which forces multiple users to share an operating system (OS) instance, reducing the application of functionality available from cloud-based virtualized operating systems such as vSphere brand server virtualization platform to individual sessions. (vSphere is a trademark of VMware, Inc.).

Remote desktop session host (RDSH) technology creates efficiencies between sessions by sharing common DLL (dynamic link library) files and by sharing a common file system cache across sessions. The shared file cache can significantly reduce input/output (I/O) since users launching the same application as their peers will retrieve application files rapidly from the shared cache. In a virtualized datacenter, this caching can offload I/O operations per second (IOPS) from shared storage arrays. Sessions also share a common OS kernel which can save background central processing unit (CPU) cycles.

However, RDSH-based application publishing on top of virtual machine (VM) servers, such as ESX brand VM servers from VMware, Inc., is not inherently more efficient than VM based approaches when it comes to CPU consumption. Further, neither architecture previously showed a consistent advantage for CPU consumption. Most of the CPU cycles in either model derive from the user applications. RDSH designs share some OS kernel driven CPU cycles across sessions, but this may be offset by the added virtual symmetric multi-processing (vSMP) co-scheduling overload when hosting multiple larger count virtual CPU (vCPU) RDSH VMs on the same ESX host. Applications within the RDSH container must be scheduled on both the OS kernel scheduler and on the underlying hypervisor in order for applications to use the hardware. A lack of coordination exists between the OS scheduler and the hypervisor scheduler which can surface as erratic user experience and application stability problems within the virtualized RDSH context.

Traditional application publishing approaches converge with VM container based designs in terms of sessions per CPU core but show a solid benefit in the area of memory sharing and I/O reduction.

SUMMARY

Examples of the present disclosure pre-launch a catalog of applications on a parent virtual machine (VM), such that the catalog of applications is locked into memory before suspending the catalog of applications and forking the parent VM during a proactive phase of application launching. The present disclosure leverages the suspended catalog of applications for use by a child VM during a reactive phase of application launching. In some cases, the child VM resumes execution of the suspended catalog of applications. In other cases, a user-specific network security token is created and bound to the catalog of applications before execution is resumed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
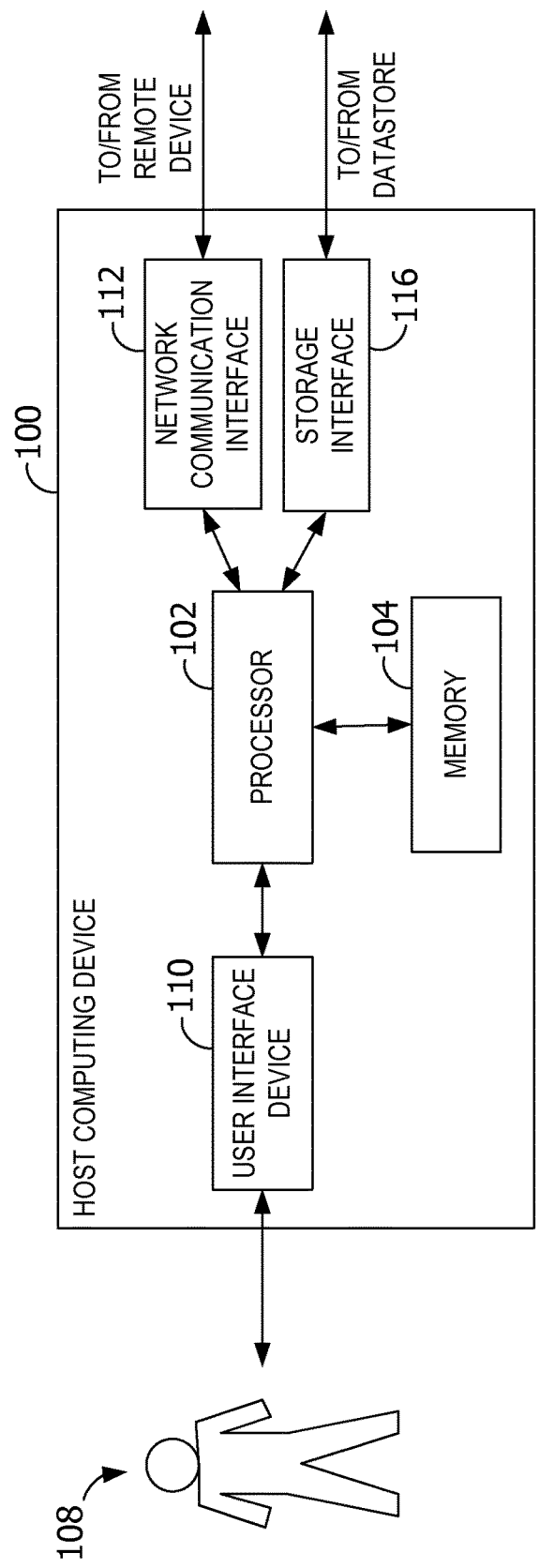
FIG. 1 is a block diagram of an example host computing device.

Aspects of the disclosure allow access to applications remotely from a virtual machine (VM)-based desktop provisioned rapidly and on demand using memory state sharing, such as provided by methods as described herein, in such a manner as to obtain session densities per host equal to or better than existing application publishing products based on remote desktop session host (RDSH). Efficient use of VMs for publishing of applications brings a number of benefits including full compatibility with various desktop operating system (OS) versions such as Windows 7 brand operating system, Windows 8 brand operating system, Vista brand operating system, and Linux brand operating system, which enables higher software compatibility by accommodating all applications, including those that will not execute properly on server based or terminal server based OS platforms. (Windows 7, Windows 8, and Vista are trademarks of Microsoft Corporation, and Linux is a trademark of Linus Torvalds). VMs also provide better isolation and stability to the application session by isolating each user session in its own logically separate VM container which cannot impact other users even if the application or OS crashes.

While described with reference to VMFork in some examples, those skilled in the art will note that any infrastructure, operations, components, and/or configuration of hardware, software, and/or firmware implementing the operations (or their equivalents or variations) described herein are within the scope of the disclosure.

Examples of the disclosure leverage the memory state inheritance aspect of VMFork for application publishing purposes by pre-launching a catalog of applications within the VMFork parent VM and further optimizing the parent VM so that all code pages of the launched applications are brought into memory and locked there to avoid any possible later eviction by the OS (e.g., which allows child VMs to avoid loading the code pages off of disk). This results in better speed, reduced CPU cycles, reduced I/O storage consumption, and increased memory sharing. These processes are then suspended within the OS of the parent VM so that they are not actively executing. The parent VM is forked in this state.

In some examples, suspending a process includes removing the process from execution on the OS kernel, or otherwise stopping execution of the process on the OS. For example, while execution of the process is halted, the process is not terminated or otherwise deleted from memory.

Child VMs thus inherit a memory state where all possible applications are already resident and launched. The application chosen by a user is selected and resumed within the OS. At some time prior to the resume command (e.g., immediately prior), a special network security token is created based on the identity of the user requesting access to the application. This token is bound to the suspended application process just prior to the process being resumed which enables the requesting user to open network files with the proper security context.

In some examples, the application chosen by the user is assigned a new network security token on the fly that is valid for the requesting user and which is bound to the suspended application process just before it is resumed in the VMFork clone. To accomplish this, the user identity (name & password) from the broker is passed into the session and an API is called to associate new network credentials to a security token. This token is bound to the chosen application just prior to the point the process resume is issued. The application can now access network files within the application under the identity of the user who requested the application rather than the local account used when the application was launched.

Aspects of the disclosure are operable with reboot-free guest-customization and third party dynamic application mounting. Additional 'memory preloading' and 'token creation' techniques expand the usefulness of the design, while increasing the benefits offered by VMFork cloning. These technologies together define a path toward a genuinely vSphere brand server virtualization platform-centric application publishing solution that leapfrogs the traditional approaches. (vSphere is a trademark of VMware, Inc.). Each user session can be governed and managed as a VM by the platform without compromising on density or cost.

'VMFork' is a rapid VM cloning method at the hypervisor level which allows many child VMs to be created from a parent VM. The parent VM itself can be 'forked' at any point and children will inherit the memory state of the parent at the point that the parent is suspended in memory. Using this method, VMs for remote application use may be created very quickly and with high resource efficiency. Preliminary testing indicates that this approach equals or surpasses the density achieved by traditional RDSH based approaches. VMFork based application publishing brings all the power of VM containers to each application session, offering low cost and superior functionality.

Using VM Fork hot cloning technology, desktop VMs may be rapidly cloned. IN some use cases, hot-clone desktops that are already logged in and have a range of 'viewer' type applications running and minimized may be created by the hot-cloning technology. Upon request, the VM is forked, viewer application is resumed on the OS kernel, and the viewer application is maximized and the requested file is loaded. In seconds the document is ready—the user gets very rapid service, and vSphere brand server virtualization platform shares memory pages across users. (vSphere is a trademark of VMware, Inc.). The VM is deleted when user disconnects from their viewer session. CPU cycles associated with login, application launch, and logoff are largely avoided, creating higher densities. More generic application publishing (app-pub) use-cases can rapidly personalize a forked VM, such as by using 'VMDK mount' technologies after the user goes through a traditional login process.

FIG. 1 is a block diagram of an example host computing device 100. Host computing device 100 includes a processor 102 for executing instructions. In some examples, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks. In FIG. 1, memory 104 refers to memory and/or storage. However, in some examples, memory 104 may refer only to memory in host computing device 100, and exclude storage units such as disk drives and hard drives. Other definitions of memory are contemplated.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 110 operates to receive data from user 108, while another device (e.g., a presentation device) operates to present data to user 108. In other examples, user interface device 110 has a single component, such as a touch screen, that functions to both output data to user 108 and receive data from user 108. In such examples, user interface device 110 operates as a presentation device for presenting information to user 108. In such examples, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some examples, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In some examples, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
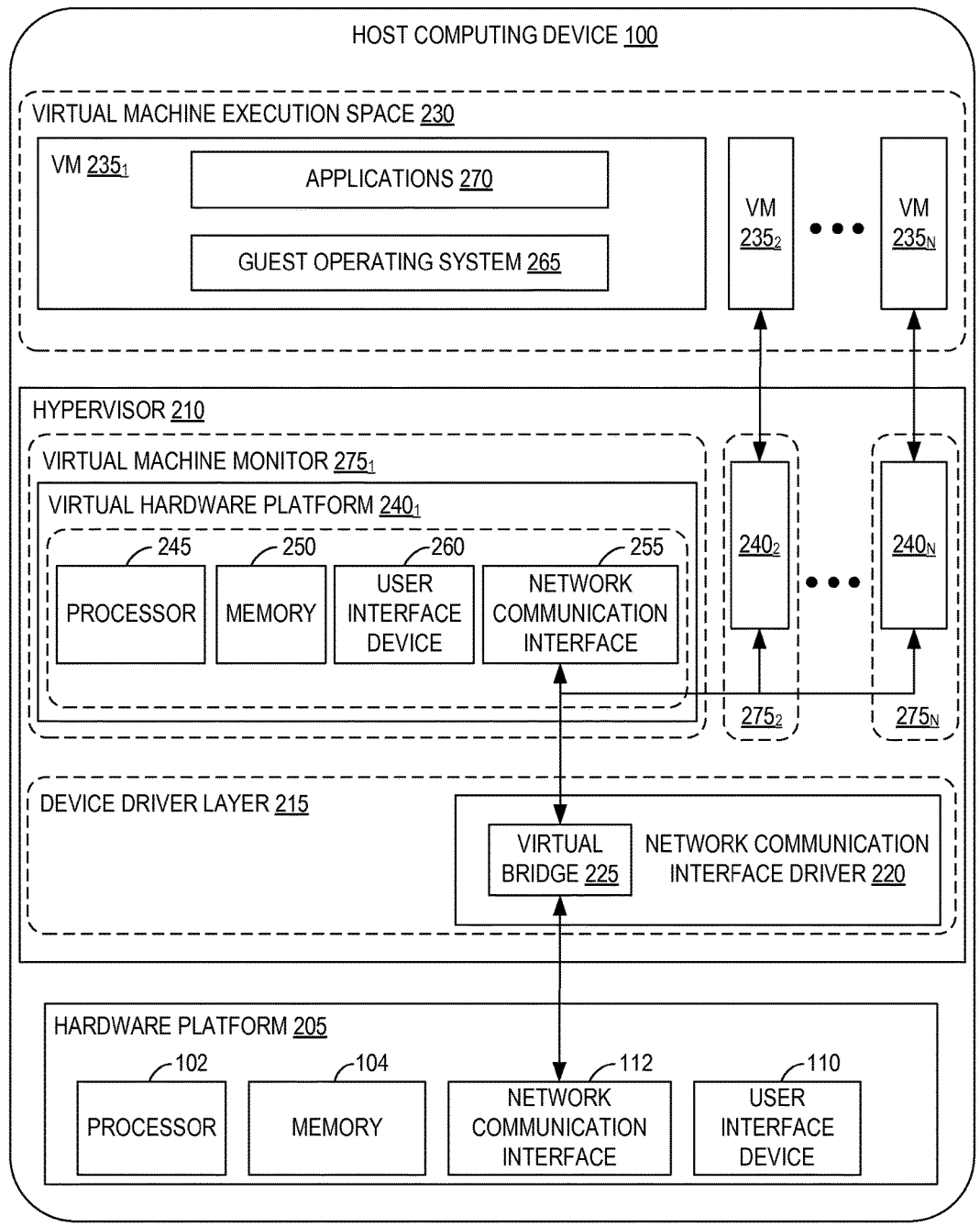
FIG. 2 is a block diagram of example virtual machines that are instantiated on a computing device, such as the host computing device shown in FIG. 1.

FIG. 2 depicts a block diagram of virtual machines $235_1$, $235_2 \ldots 235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106. A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM $235_1$ from a management device via network communication interface 112 and execute the execution instruction to initiate execution of first VM $235_1$.

In some examples, memory 250 in first virtual hardware platform $240_1$ includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM $235_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs $235_1$-$235_N$). Each virtual communication interface for each VM $235_1$-$235_N$, such as network communication interface 255 for first VM $235_1$, may be assigned a unique virtual Media Access Control (MAC) address that enables virtual bridge 225 to simulate the forwarding of incoming data packets from network communication interface 112. In an example, network communication interface 112 is an Ethernet adapter that is configured in "promiscuous mode" such that Ethernet packets that it receives (rather than just Ethernet packets addressed to its own physical MAC address) are passed to virtual bridge 225, which, in turn, is able to further forward the Ethernet packets to VMs $235_1$-$235_N$. This configuration enables an Ethernet packet that has a virtual MAC address as its destination address to properly reach the VM in host computing device 100 with a virtual communication interface that corresponds to such virtual MAC address.

Virtual hardware platform $240_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM $235_1$. Aspects of the disclosure are operable with any computer architecture, including non-x86-compatible processor structures such as those from Acorn RISC (reduced instruction set computing) Machines (ARM), and operating systems other than those identified herein as examples.

Virtual hardware platforms $240_1$-$240_N$ may be considered to be part of virtual machine monitors (VMM) $275_1$-$275_N$ that implement virtual system support to coordinate operations between hypervisor 210 and corresponding VMs $235_1$-$235_N$. Those with ordinary skill in the art will recognize that the various terms, layers, and categorizations used to describe the virtualization components may be referred to differently without departing from their functionality or the spirit or scope of the disclosure. For example, virtual hardware platforms $240_1$-$240_N$ may also be considered to be separate from VMMs $275_1$-$275_N$, and VMMs $275_1$-$275_N$ may be considered to be separate from hypervisor 210. One example of hypervisor 210 that may be used in an example of the disclosure is included as a component in VMware's ESX brand software, which is commercially available from VMware, Inc.

The host computing device may include any computing device or processing unit. For example, the computing device may represent a group of processing units or other computing devices, such as in a cloud computing configuration. The computing device has at least one processor and a memory area. The processor includes any quantity of processing units, and is programmed to execute computer-executable instructions for implementing aspects of the disclosure. The instructions may be performed by the processor or by multiple processors executing within the computing device, or performed by a processor external to computing device. In some examples, the processor is programmed to execute instructions such as those illustrated in the figures.

The memory area includes any quantity of computer-readable media associated with or accessible by the computing device. The memory area, or portions thereof, may be internal to the computing device, external to computing device, or both.

Figure 3:
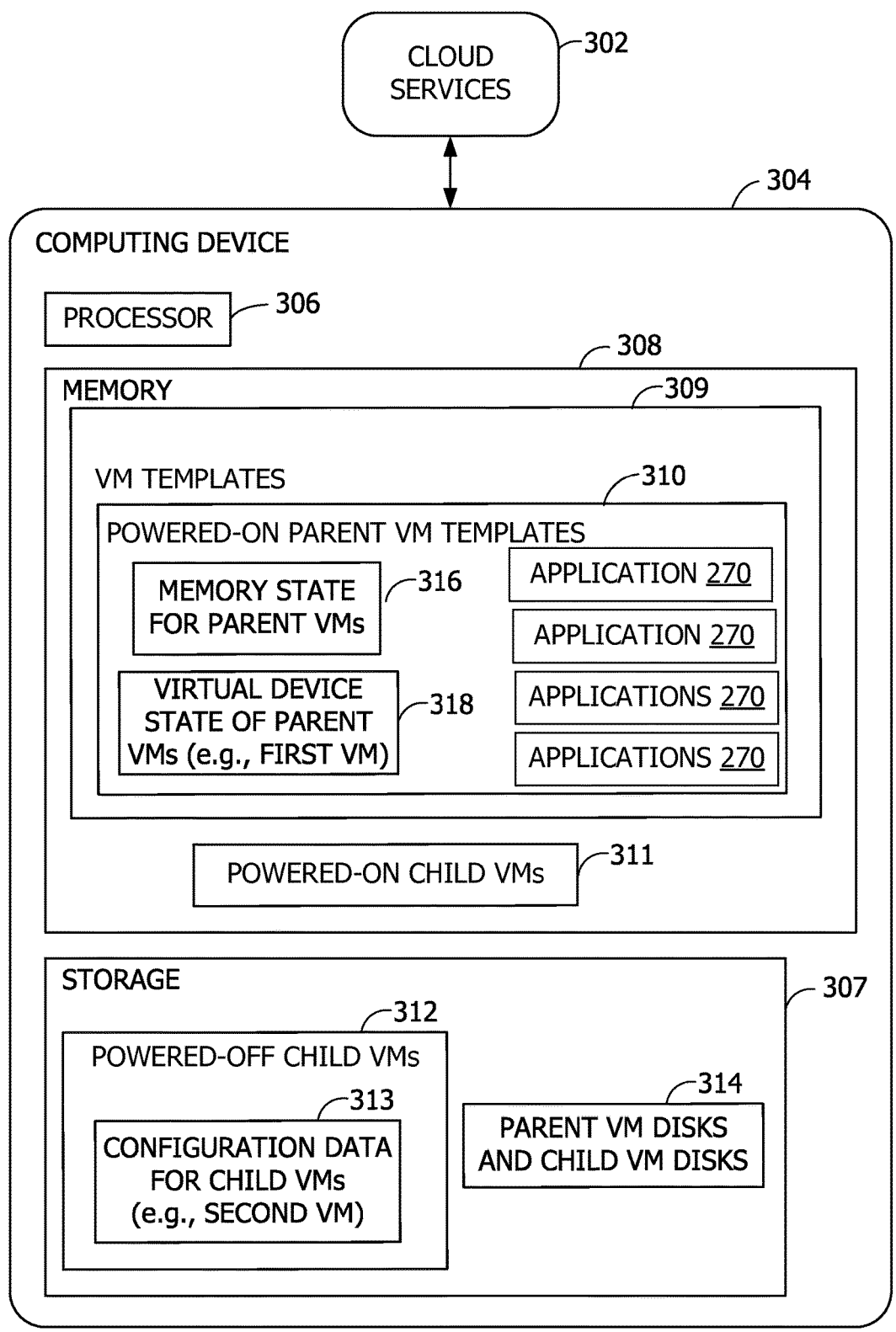
FIG. 3 is a block diagram of an example system including parent virtual machine (VM) templates that include one or more pre-opened applications.

FIG. 3 is a block diagram of an example system which utilizes cloud services to create, store, and retrieve child VMs. In the example of FIG. 3, a computing device 304 is in communication with cloud services 302. The computing device 304 includes a processor 306, memory 308, and storage 307.

The memory 308 stores a plurality of VM templates 309. In some examples, VM templates 309 are arranged in a hierarchy, such as a tree hierarchy. However, aspects of the disclosure are operable with VM templates 309 stored in any structure. In such examples, VM templates 309 include a plurality of powered-on parent VM templates 310. The powered-on parent VM templates 310 may be created and maintained by computing fabric cloud service and/or by cloud services 302, or by any other computing device 304. The powered-on parent VM templates 310 may be classified, categorized, or otherwise described as derived VM templates and standalone VM templates. Derived VM templates are derived from one of the powered-on parent VM templates 310, and inherit one or more disk blocks (e.g., "common" disk blocks) from that corresponding powered-on parent VM template 310. The standalone VM templates lack any such inherited disk block from parent VM templates 310. Aspects of the disclosure are operable with any form of disk block inheritance, such as via a redo log, array-level snapshots (e.g., using block reference counting), etc.

In some examples, each powered-on parent VM template 310 includes a virtual device state 318 for one of VMs 235 (shown in FIG. 2) and a memory state 316 for that VM 235. In some examples, one or more powered-on parent VM templates 310 include pre-launched applications 270 published by the processor 306 and/or the hypervisor 210 (shown in FIG. 2). In one example, the hypervisor 210 brings memory and/or code pages into memory 308 to publish the applications 270. The applications 270 are locked in memory 308 by any means known, including memory page stuffing.

Memory 308 further stores data describing a plurality of powered-on child VMs 311. A powered-on child VM 311 is instantiated from a powered-on parent VM template 310 using, for example, a powerOnChildren( ) function call. The powerOnChildren( ) function call leverages fast VM 235 instantiation techniques, such as those as described herein, to quickly spawn VMs 235 with minimal processor overhead. The powered-on child VM 311 shares one or more memory pages with an associated powered-on parent VM template 310. The powered-on child VM 311 is entered into memory 308 and any modification and/or change of the child VMs 311 is entered into memory 308 as COW. The powered-on child VMs 311 may also be powered off or reset using the powerOffChildren( ) function call and the powerResetChildren( ) function call, respectively.

When powered off, the powered-on child VM 311 becomes a powered-off child VM 312. Storage 307 stores data describing a plurality of powered-off child VMs 312. A powered-off child VM 312 is instantiated, on demand, from a powered-on parent VM template 310. After instantiation, powered-off child VMs 312 are registered to the cloud operating system (not illustrated). In some examples, the cloud operating system is executed by the computing device 304. Registration of one of powered-off child VMs 312 includes identifying powered-off child VM 312 to the cloud operating system, and occurs before powered-off child VM 312 is powered-on or otherwise executed. In this manner, powered-off child VM 312 is said to be pre-registered with the cloud operating system. In some examples, the cloud operating system is the hypervisor 210.

Powered-off child VMs 312 occupy no memory resources or few memory resources. Moreover, by registering powered-off child VMs 312, the cloud operating system is no longer in the critical path when cloud services 302 commission VMs 235, thus reducing the amount of time needed for child VMs to become available. However, aspects of the disclosure are also operable with registration occurring on the child VM instantiation path.

Child VMs 311 and/or 312 have one or more properties, characteristics, or data associated therewith. In some examples, the child VM properties for each child VM (e.g., second VM) may be referred to as configuration data 313. In some examples, configuration data 313 for the child VM is defined, created, received, and/or registered prior to receiving a request to fork the child VM (e.g., from a management level application). In other examples, configuration data 313 is defined in response to receiving the request to fork the powered-on child VM 311. Configuration data 313 may be defined from default values set by an administrator, received in the request from the management level application, and/or populated with data from other sources. Example configuration data 313 for the child VM 311 and/or 312 includes an IP address, a MAC address, a hostname, a domain identity, a processor size, memory size, a set of attributes, and/or any other state data to be applied when customizing the identity of the child VM 311 and/or 312. In some examples, configuration data 313 is stored in a file such as a .vmx file, with one file per child VM 311 and/or 312. Configuration data 313 may be registered with virtualization software, such as the cloud operating system.

In some examples, cloud service 302 specifies whether to create a standalone template or a derived VM template (e.g., from another parent VM template 310). For example, cloud service 302 creates a defined quantity of registered (e.g., to the cloud operating system) but powered-off child VMs 312 using the createChildren( ) function call. The createChildren( ) function call also takes as input a childProperties argument which defines, for example, the identities (e.g., hostname, IP/MAC address, etc.) and particular processor and/or memory sizes of the child VMs 312. If the sizes are different from that of an existing powered-on parent VM template 310, computing fabric cloud service may either add those resources when powering on a powered-off child VM 312 such that the powered-off child VM 312 becomes a powered-on child VM 311 (e.g., a "hot add") or create a new powered-on parent VM template 310 having the desired resources and creating a new child VM 311 from the new powered-on parent VM template 310. In addition, the childProperties argument also specifies how the child VM 311 and/or 312 behaves when powered-on and/or reset. For example, the child VM 311 and/or 312 may act as an ephemeral entity that returns to a parent state, or a regular VM 235 that goes through a usual boot process. For example, a child VM 311 and/or 312 will be ephemeral if the COW changes are only maintained for the duration of the virtual desktop sessions. In other examples, the COW changes may be permanently written to storage, and accessed upon boot or upon demand by the user.

In some examples, the computing device 304 defines a virtual device state of the child VM 311 and/or 312 based on virtual device state 318 of the powered-on parent VM template 310. For example, defining the virtual device state of the child VM 311 and/or 312 includes copying virtual device state 318 from the powered-on parent VM template 310. As another example, defining the virtual device state of the child VM 311 and/or 312 includes creating a COW delta disk referencing virtual device state of the powered-on parent VM template 310. Alternatively, the virtual device state depends, for example, on user 108 criteria, the system capabilities or the applications the child VM is running.

In contrast to memory 308, the example storage 307 includes one or more disks. In some examples, storage 307 includes parent VM disks and child VM disks 314 (e.g., .vmdk files) for use by VMs 235.

The computing device 304, in some examples, defines, creates, receives, and/or registers persistent storage for the child VM 311 and/or 312 based on persistent storage (.vmdk) of the powered-on parent VM template 310. In some examples, persistent storage for the child VM is stored in a file, such as a .vmdk file. For example, defining the persistent storage for the child VM 311 and/or 312 includes referencing persistent storage of the powered-on parent VM template 310. In some examples, referencing persistent storage of the powered-on parent VM template 310 includes creating a read-only base disk referencing persistent storage of the powered-on parent VM template 310, and creating a COW delta disk (associated with the child VM) to store changes made by the child VM to the base disk.

In some examples, computing device 304 defines, creates, receives, and/or registers memory 308 for the child VM 311 and/or 312 based on memory 308 of the powered-on parent VM template 310. In some examples, referencing memory of the powered-on parent VM template 310 includes creating COW memory (associated with the child VM) to store changes made by the child VM to memory of the powered-on parent VM template 310. In this manner, the child VM shares memory state of the powered-on parent VM template 310 with COW memory pages, in contrast with linked clones that use COW delta disks.

The computing device 304 executes (e.g., powers on) the child VM 312, which becomes powered-on child VM 311. Execution of child VM 312 includes configuring an identity of child VM 311 and/or 312 using configuration data 313. In some examples, execution of child VM 312 includes configuration and execution of a boot process (or bootup process) to access and apply configuration data 313 to child VM 311 and/or 312. In this manner, child VM 311 and/or 312 customizes itself during bootup. The now-executing child VM 311 has a virtual device state that is a copy of virtual device state 318 of the powered-on parent VM template 310, with persistent storage referencing persistent storage of the powered-on parent VM template 310.

In some examples, the bootup process is executed by a guest operating system 265 (shown in FIG. 2) on child VM 311 and/or 312. The bootup process includes, for example, a command to perform a synchronous remote procedure call (RPC) to the cloud operating system to obtain and apply configuration data 313. An example format for the RPC is "rpc 'info-get'".

The forked child VM 311 and/or 312 may be configured in different ways, dependent in part on a type of guest operating system 265 executing on powered-on child VM 311. One example for configuring an identity of child VM 311 and/or 312 is next described.

In some examples of the disclosure, the boot process applies customization to the child VM 311 and/or 312. The boot process includes a blocking agent that prevents the child VM 311 and/or 312 from completing bootup until certain operations have completed. For example, the blocking agent is injected into the boot process to prevent the guest operating system 265 on the child VM 311 and/or 312 from accepting user-level commands until the identity of the child VM 311 and/or 312 has been configured.

The powered-on child VM 311, in some examples, accesses configuration data 313 which specifies a domain identity to be applied to the powered-on child VM 311. The domain identity is one of a plurality or pool of previously-created domain identities available to the powered-on child VM 311. The plurality of domain identities are created, for example, by an administrator before the virtual device state of the powered-on child VM 311 and the persistent storage of the powered-on parent VM template 310 are defined.

The domain identity is pre-selected (e.g., explicitly identified in configuration data 313) in some examples, or selected during execution of the bootup process (e.g., based on characteristics of executing powered-on child VM 311). The specified domain identity is from the pool of previously-created identities. Then the obtained domain identity is applied to the powered-on child VM 311. In some examples, applying the obtained domain identity includes performing an offline domain join operation, or any method that allows a computer system to join a domain without a reboot.

In operation, preparing the powered-on parent VM template 310 may be performed, for example, by a guest agent residing inside a guest operating system 265 of the powered-on parent VM template 310. The guest agent issues a fork command to quiesce the powered-on parent VM template 310 into the ready-to-fork state at an appropriate boot stage of the parent VM. As provisioning operations are initiated, the one or more powered-off child VMs 312 are created without a committed identity. As the boot process continues inside each powered-off child VMs 312 as it becomes a powered-on child VM 311, the various identities are applied to the powered-on child VMs 311. For example, due to the forking process as described herein, a copy of the guest agent from the powered-on parent VM template 310 appears in each child VM 311 and/or 312. The copy of the guest agent resumes execution inside each child VM 311 and/or 312 as part of the boot process of the guest operating system 265. In this post-fork stage, for each child VM 311 and/or 312, the guest agent obtains (e.g., from a data store available to the guest operating system 265 of the child VM 311 and/or 312) and applies one or more identities to the powered-on child VM 311. For example, the identities, or other parameters are stored as part of configuration data 313 in a .vmx file, or other file stored by the cloud operating system and accessible via API from within the guest operating system 265. In operation, the guest operating system 265 synchronously requests and receives one of the identities from the cloud operating system to perform an offline domain join (e.g., update the identity in place) before proceeding through the tail end of the bootup process (e.g., before the system launches the logon service).

The operations discussed above may be embodied as computer-executable instructions stored on one or more computer-readable media. The instructions, when executed by processor 306, configure an identity of a forked VM 235 based on a pool of available domain identities.

The forking and state customization operations illustrated and described may be implemented using templates and API to configure and deploy the child VM 311 and/or 312 in response to a request from cloud service 302. In some examples, computing device 304 creates and maintains a hierarchy of parent VM templates 310 and child VMs 311 and/or 312. For example, computing device 304 maintains a set of powered-on parent VM templates 310 and a set of powered-off child VMs 312. Parent VM templates 310 are created, in some examples, in response to a request from at least one of cloud services 302. Alternatively or in addition, parent VM templates 310 are created on demand by computing device 304 after detecting patterns in VM 235 provisioning requests from cloud services 302. Maintaining the set of parent VM templates 310 includes, for example, powering-on each of parent VM templates 310. Each child VM 311 and/or 312 is instantiated from one of parent VM templates 310 in response to a request for the child VM 311 and/or 312. Maintaining the set of child VMs 311 and/or 312 includes, for example, pre-registering each instantiated powered-off child VM 312 to the cloud operating system (e.g., before being initiated or otherwise powered-on). Alternatively or in addition, one or more of cloud services 302 may create and maintain one or more of parent VM templates 310.

In the teardown phase, parent VM templates 310 and child VMs 311 and/or 312 may be destroyed using the destroyParentTemplate( ) and destroyChildren( ) function calls. Depending on whether parent VM template 310 is part of the template hierarchy (e.g., a derived VM template) or a standalone template, destroying the template may not remove it completely from disk. The destroyChildren( ) function call turns off the powered-on child VM 311 (e.g., power down) and resets the child VM 311 and/or 312 properties such as identity, etc.

In automatic mode, rather than have parent VM templates 310 be explicitly created via the function calls available in manual mode, parent VM templates 310 are automatically generated based on demand. For example, cloud service 302 uses the createChildrenAuto( ) function call to create child VMs 311. When a particular type of child VM 311 and/or 312 is requested repeatedly (e.g., a plurality of requests are received for the same type of child VM 311 and/or 312), computing fabric cloud service creates a new powered-on parent VM template 310, deriving it from the appropriate parent VM template 310 in the hierarchy. This optimization further simplifies the setup and teardown phases by eliminating the need for cloud services 302 to explicitly create, destroy, and otherwise manage parent VM templates 310. In some examples, the new parent VM template 310 is created only if additional requests are expected for such VMs. For example, if the request for a particular VM 235 is a one-off request, the new parent VM template 310 is not created.

VM instantiation operations are performed on VMs 235 stored in one or more datastores. Example VM instantiation operations include, but are not limited to, cloning, copying, forking, and the like. VM instantiation operations may be performed by virtualization products such as VMware's ESX brand software (e.g., in a kernel layer). In some examples, VM instantiation operations implement fast-suspend-resume technology with COW page references (e.g., rather than handing over pages entirely). While described herein with reference to VM forking routines in some examples, those of ordinary skill in the art will note that the disclosure is not limited to these VM forking routines. Rather, the disclosure is operable with any fast VM instantiation routines.

Figure 4:
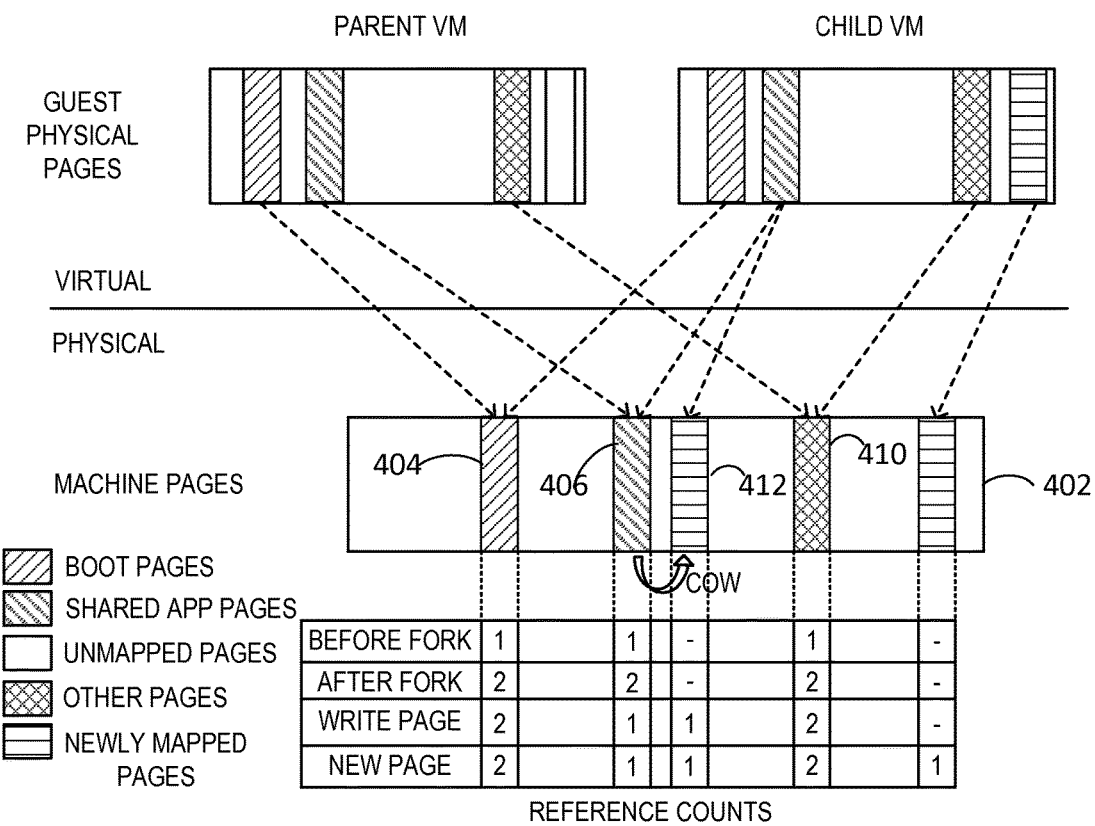
FIG. 4 is a block diagram illustrating the interrelation between example forked child and parent VMs and their associated storage.

FIG. 4 is a block diagram illustrating the usage of a powered-on parent VM template 310 and child VM 311 and/or 312 of common and exclusive machine pages. The relationship of the virtual and physical aspects of the disclosure are represented. A powered-on parent VM template 310 and a child VM 311 and/or 312 reside in the virtual space. Both the powered-on parent VM template 310 and the child VM 311 and/or 312 access machine pages 402 which are located on physical storage 307.

Five types of regions are illustrated on the machine pages 402. The first type of machine pages illustrated are boot pages 404 (illustrated with lines slanting upwards from left to right). Shared application pages (shared app pages) 406 are illustrated with lines slanting downwards from left to right. Unmapped pages 402 are illustrated by white area on the machine pages 402. Other pages 410 created by the VMs are illustrated by cross-hatches. Newly mapped pages 412 are illustrated by horizontal lines.

FIG. 4 illustrates the sharing of common pages between powered-on parent VM templates 310 and the child VM 311 and/or 312. In the example of FIG. 4, before the child VM 311 and/or 312 is created (also referred to as "before fork") the only existing pages are the boot pages 404, shared app pages 406, and other pages 410. The only VM which is using those pages is the powered-on parent VM template 310, so the "reference counts" for those pages is 1. The powered-on parent VM template 310 is then forked, creating a child VM 311 and/or 312. After the fork occurs, two VMs point to the boot pages 404, the powered-on parent VM template 310 and the child VM 311 and/or 312. Likewise, both the child VM 311 and/or 312 and the powered-on parent VM template 310 point to the shared app pages 406 and the other pages 410 after the fork. Consequently, each of these pages has a reference count of 2, in this example, as both the child VM 311 and/or 312 and the powered-on parent VM template 310 are pointing to them. In another example, there could be more reference counts to these pages if more child VMs 311 and/or 312 are created.

After forking, but before creating any new content, the child VM 311 and/or 312 has no independent pages, but rather relies on the stored pages of the powered-on parent VM template 310. The computing device 304 tags, marks, configures, or otherwise indicates that persistent storage of the powered-on parent VM template 310 is COW. Tagging the persistent storage 307 and memory 308 of the powered-on parent VM template 310 as COW prevents the powered-on parent VM template 310 from modifying persistent storage 307 or memory 308 that the child VM 311 and/or 312 is relying upon. Instead, if the powered-on parent VM template 310 attempts to modify either persistent storage 307 or memory 308, a copy of that data is created for the powered-on parent VM template 310 leaving the original persistent storage 307 or memory 308 intact.

Once the powered-on child VM 311 writes, it creates its own copy of a page, a copy on write (COW) version of that page. In the example of FIG. 4, the powered-on child VM 311 writes to the shared app pages 406, thus creating a COW page, the newly mapped page 412 in the figure. Once this new write has occurred, the powered-on parent VM template 310 still points to the shared app pages 406, but the powered-on child VM 311 now points to its newly mapped page 412. FIG. 4 reflects that after the COW pages are created, the child VM 311 and/or 312, in this example, does not point to the shared app pages 406 of the powered-on parent VM template 310, and thus the reference count for the shared app pages 406 drop to 1. The reference counts for the newly mapped pages 412 increase to 1, since the powered-on child VM 311 created that new page and now points to it. The reference counts for the boot pages 404 and the other pages 410 remain at 2, since in the example illustrated both the child VM 311 and the powered-on parent VM template 310 still point to those pages.

After the powered-on child VM 311 has created a newly mapped page 412 it writes that page to the physical machine pages 402. After that newly mapped page 412 is written, there is one reference to it, by the powered-on child VM 311. In the example of FIG. 4, there are two newly mapped pages 412 created.

The first newly mapped page 412 is a modification of an existing page stored by the powered-on parent VM template 310. In some examples, the newly mapped page 412 points back to the shared app pages 406 which it modifies, and only the changes made by the powered-on child VM 311 to the shared app pages 406 are recorded on the newly mapped pages 412. In other examples, the powered-on child VM 311 no longer relies on the powered-on parent VM template 310 for the modified shared app pages 406, and instead the child VM 311 only utilizes its newly created page.

The second newly mapped page 412 is original content created by the powered-on child VM 311. That newly mapped page 412 does not indicate that it is a modification of any previously existing page. Instead, that newly mapped page 412 is solely tied to the child VM 311 and/or 312, and only the child VM 311 and/or 312 references it.

Figure 5:
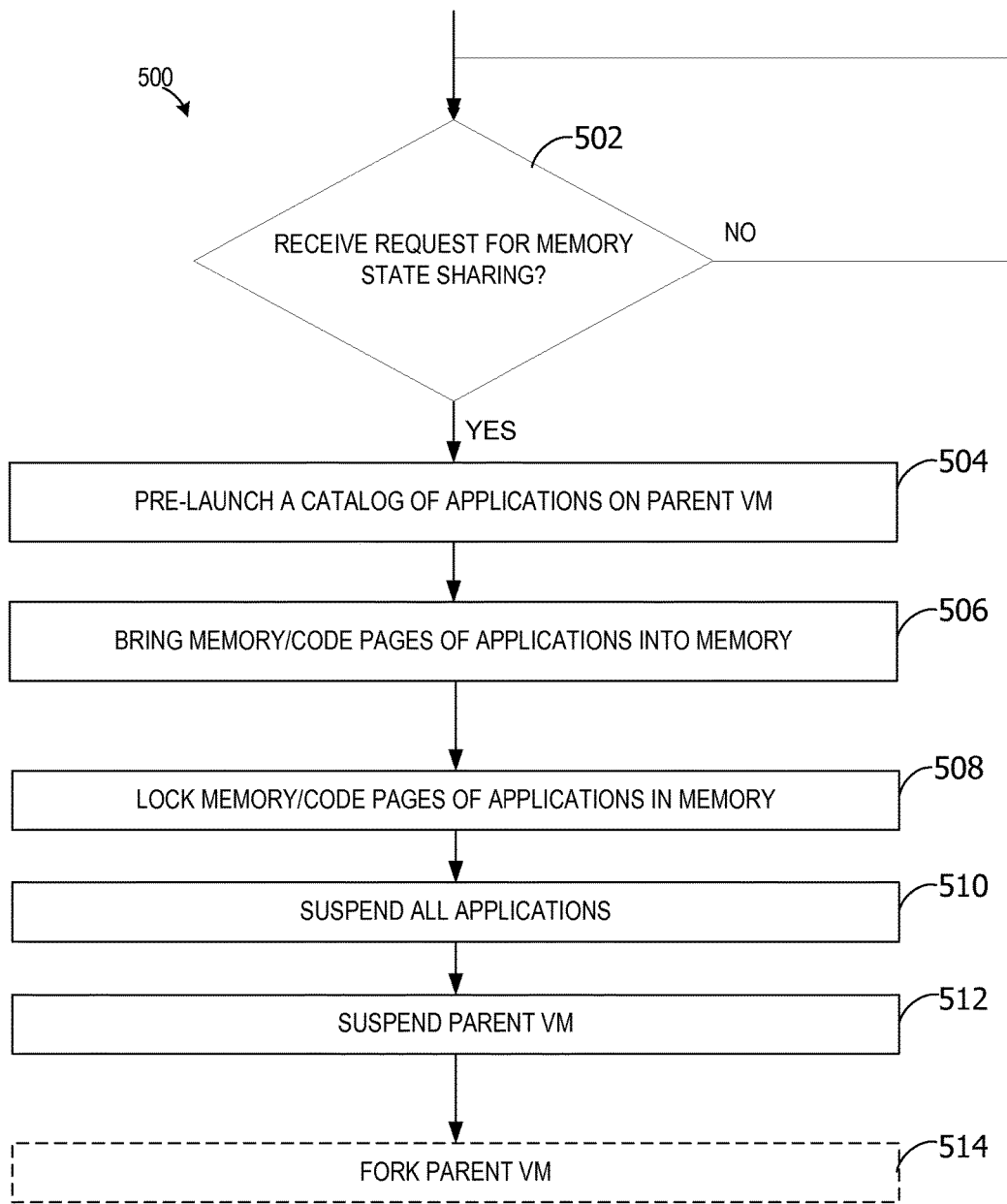
FIG. 5 is a flowchart of an example method of a proactive phase of application launching.

FIG. 5 is a flowchart of an example method of the proactive phase of application launching by the parent VM. While method 500 is described with reference to execution by a processor, or a hypervisor 210, it is contemplated that method 500 may be performed by any computing device. Further, execution of the operations illustrated in FIG. 5 is not limited to a VM environment, but is applicable to any multi-application, multi-user environment. Additionally, while the claim language is drawn to launch of applications by a single parent VM, it is understood that the method may likewise be utilized for pre-launching of different catalogs of applications on multiple VMs. Also, one or more computer-readable storage media storing computer-executable instructions may execute to cause a processor to implement the pre-launching by performing the operations illustrated in FIG. 5.

Figure 7:
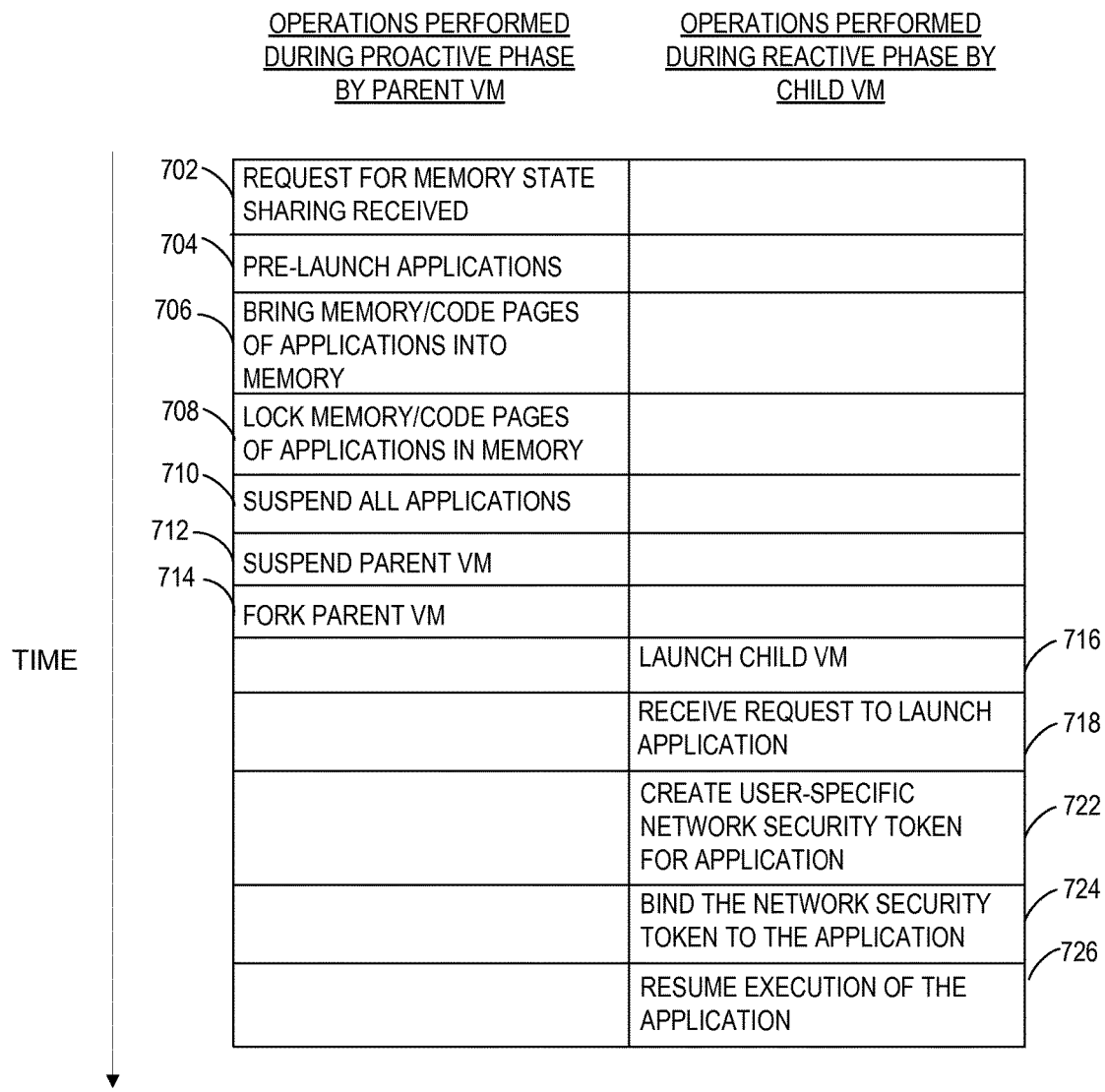
FIG. 7 is an example sequence of operations performed by parent and child VMs during proactive and reactive phases of application launching.

The operations of the example method of 500 are carried out by a processor associated with the powered-on parent VM template 310. The hypervisor 210 coordinates operations carried out by the processors associated with the powered-on parent VM template 310 and the powered-on child VM 311 and the associated applications 270. FIG. 7, described below, illustrates the sequence of the proactive and reactive phases, executed by the powered-on parent VM template 310 and the powered-on child VM 311.

At 502, a request for memory state sharing between the powered-on parent VM template 310 and a child VM 311 and/or 312 is received. The request initiates from the hypervisor 210 or the user 108, or is triggered by an event occurring at the powered-on parent VM template 310. For example, in at least some examples, the powered-on parent VM template 310 is monitored for a request by user 108 for a stateless desktop. In other examples, the powered-on parent VM template 310 is monitored for a scheduled shift change, which requires provisioning of several child VMs 311 and/or 312. Requests for memory state sharing are, in some examples, periodic, or otherwise occurring at regular intervals. In other examples, requests for memory state sharing are made during system downtime, when I/O commands fall below a threshold amount established, for instance, by users 108. In other examples, requests for memory state sharing are in response to system conditions such as anticipated software upgrades, downtimes, or other known or predicted hardware or software events.

The VM utilized as the powered-on parent VM template 310 is prepared by disabling unnecessary services and components. For example, the OS memory optimizations, such as write cache and paging, are disabled in the powered-on parent VM template 310. The hypervisor 210 is utilized to perform those services, reducing COW activity on powered-on child VMs 311.

At 504, one or more applications 270 (e.g., a catalog of applications 270) are pre-launched on the powered-on parent VM template 310. In some examples a startup-script is used to pre-launch application pages.

The memory or code pages of the applications 270 are brought and/or pre-loaded into memory at 506. Applications 270, in some examples, are locked into memory using a special utility that touches each code page, forcing it to be resident in memory of the powered-on parent VM template 310, and then locks the process into memory. Locking the applications 270 into memory permits the child VMs 311 to avoid ever loading any code pages off disk. This aspect of the disclosure results in less frequent writes by the powered-on child VM 311.

Execution of the applications 270 are suspended at 510. Suspending the applications 270 ensures no interactions between launched applications of the powered-on parent VM template 310 and applications resumed by the powered-on child VM 311. The powered-on parent VM template 310 is suspended at 512.

At 514, optionally, the powered-on parent VM template 310 is forked. Alternatively, the powered-on parent VM template 310 may be forked upon receipt of a triggering event. A triggering event includes, for example, a user logging into the system, a request from a hypervisor 210, or a pre-programmed forking (e.g. a forking which occurs at a specified time, or in response to a hardware or software condition). Forking the powered-on parent VM template 310 results in a child VM 311 and/or 312 that has applications 270 pre-launched in a pre-logged-in session, within a few seconds.

In an example forking routine, one of VMs 235 is quiesced (thus becoming powered-on parent VM template 310), and then a defined quantity of child VMs may be created using the memory, disk, and device state image of this parent VM template 310. Such a forking routing may be organized into three stages: preparing a parent VM, preparing the child VM, and spawning the child VM.

To prepare a parent VM template 310 (e.g., a target VM), the powered-on parent VM template 310 is first powered-on and brought into a state from which powered-off child VMs 312 are desired to begin execution. For example, preparing includes bringing down network interfaces in the parent VM in preparation for an in-guest identity change. When the powered-on parent VM template 310 is ready to be forked, user 108 or script issues a command via a guest remote procedure call (RPC) to hypervisor 210 requesting the forking. The fork request, in some examples, is a synchronous RPC that returns only after the fork process has succeeded. Hypervisor 210 handles the guest RPC by quiescing the powered-on parent VM template 310, halting an execution state associated with the powered-on parent VM template 310, and marking the memory pages in the powered-on parent VM template 310 as copy-on-write (COW). The memory and disk state of the powered-on parent VM template 310 are then ready for use by child VMs 311 and/or 312. In at least some examples, the powered-on parent VM template 310 does not run another instruction upon issuing the guest RPC.

To prepare the child VM 311, the child VM 311 and/or 312 is configured to leverage the existing memory, device, and disk state of the powered-on parent VM template 310. To share the disk of the powered-on parent VM template 310, the child VM 311 and/or 312 is configured with a redo log pointing to the disk of the powered-on parent VM template 310 as the base disk of the child VM 311 and/or 312 (e.g., similar to a linked clone VM). In addition, the child VM 311 may be configured with its own dedicated storage that is not related to the powered-on parent VM template 310. For example, the dedicated storage may include a data disk or access to shared storage if the child VM 311 and/or 312 desires to persist state in storage other than its redo log.

A configuration file (e.g., .vmx file) associated with the child VM 311 and/or 312 is updated to indicate that the child VM 311 and/or 312 inherits the memory and device state of the powered-on parent VM template 310 upon power-on. The configuration file may also be updated with additional information, such as a desired MAC address and IP address for the powered-on child VM 311. The configuration file is registered with the cloud operating system (e.g., executing on a host), and the powered-off child VM 312 is ready to be powered-on on demand.

In some examples, the redo log of the child VM 311 and/or 312 is marked as non-persistent. In such examples, upon each power-on, the powered-on child VM 311 inherits a fresh copy of the memory, device, and disk state of the powered-on parent VM template 310 (e.g., re-forks from the quiesced image of the powered-on parent VM template 310). In other examples, the redo log of the powered-on child VM 311 is marked as persistent.

After preparation, the powered-off child VM 312 is ready to be powered-on (e.g., spawned) upon receipt of a power-on request (e.g., from cloud service 302 or from computing fabric cloud service). In response to receipt of such a power-on request, the child VM 311 and/or 312 inherits the memory and device state of parent VM template 310. As such, rather than performing a normal boot process, such as through the basic input output system (BIOS), the powered-on child VM 311 instead resumes from the state of parent VM template 310. For example, the powered-on child VM 311 inherits a COW reference to the memory state of parent VM template 310, such as shown in FIG. 4. Referencing COW memory on the same host eliminates overhead for unmapped pages and results in a small overhead for mapped pages (e.g., less than one microsecond for four kilobyte pages), thus providing fast child VM instantiation. FIG. 4 also illustrates the reference counts for each of the example pages shown in the figure before and after forking, when writing a page, and when creating a new page.

Further, by referencing COW memory, the child VM 311 and/or 312 is able to begin execution in a fraction of a second from the precise instruction (e.g., fork guest RPC) at which parent VM template 310 (from which parent VM template 310 was created) was quiesced. From the perspective of the child VM 311 and/or 312, the child VM 311 and/or 312 sees the fork guest RPC returning successfully from hypervisor 210. The child 311 and/or 312 311 may then be migrated away from parent VM template 310 without need for one-to-many migrations (e.g., one-to-many vMotion brand live migrating component operations). (vMotion is a trademark of VMware, Inc.)

Computing fabric cloud service handles return of the fork guest RPC by customizing the powered-on child VM 311. Customizing the child VM includes, for example, reading and applying a desired configuration state from the configuration file specified when preparing the child VM 311 and/or 312. As described herein, some examples customize the child VM 311 and/or 312 by identifying and applying a MAC address, IP address, hostname, and other state to the powered-on child VM 311. Leveraging the customization data, the child VM may then spoof its MAC address to the desired MAC address, update its hostname, IP address, etc., and bring up its network interface. The powered-on child VM 311 then continues execution as a unique VM (e.g., separate from parent VM template 310) with its own identity.

Figure 6:
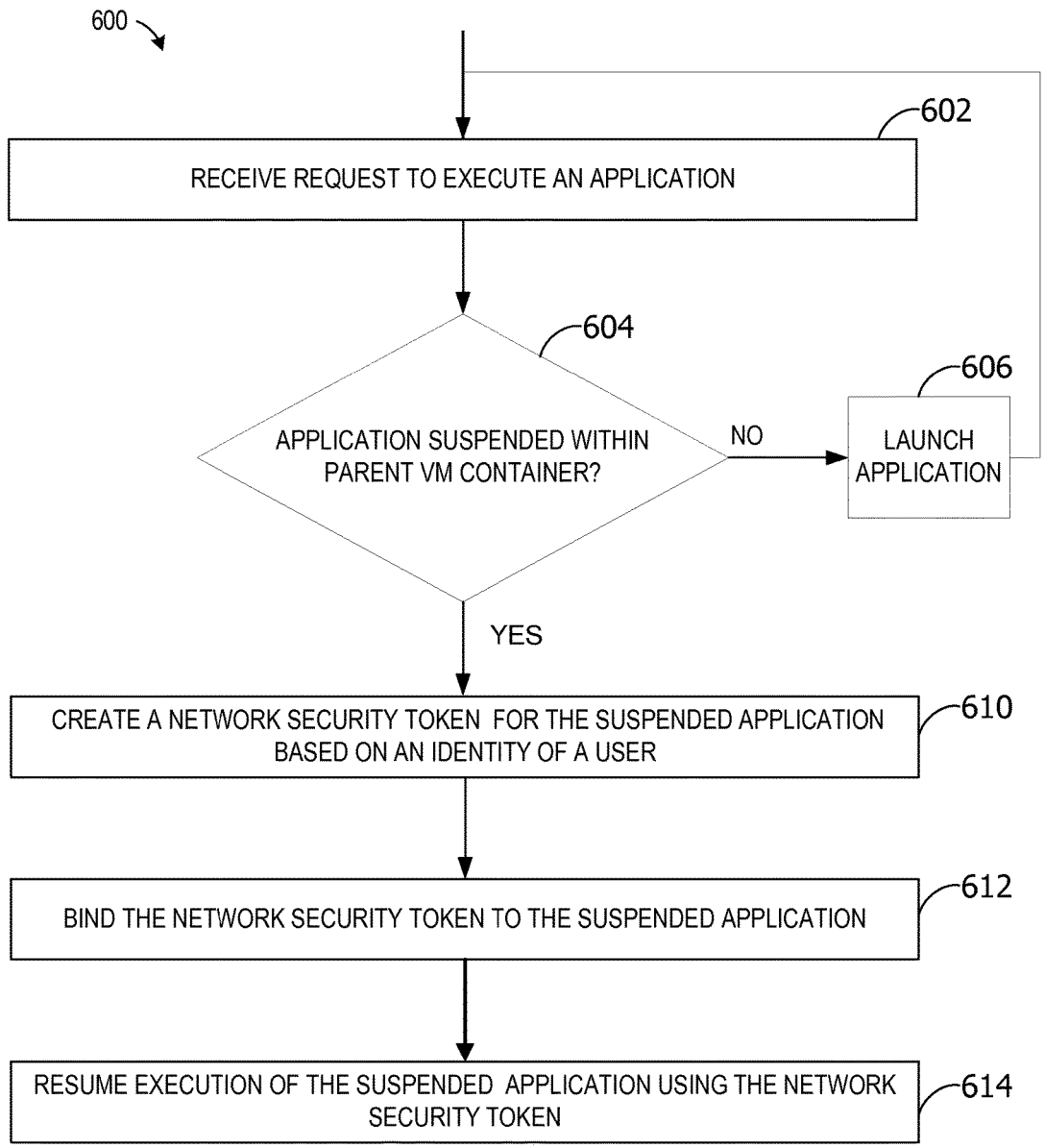
FIG. 6 is a flowchart of an example method of a reactive phase of application launching.

FIG. 6 is a flowchart of an example method of the reactive phase of application launching. While method 600 is described with reference to execution by a processor, or a hypervisor 210, it is contemplated that method 600 may be performed by any computing device. Further, execution of the operations illustrated in FIG. 6 is not limited to a VM environment, but is applicable to any multi-application, multi-user environment. Additionally, while the claim language is drawn to resumption of applications by a single child VM, it is understood that the method may likewise be utilized for resuming pre-launched catalogs of applications on multiple VMs. Also, one or more computer-readable storage media storing computer-executable instructions may execute to cause a processor to implement the resumption of applications by performing the operations illustrated in FIG. 6.

The operations of the example method of 600 are carried out by a processor associated with the child VM 311 and/or 312. The hypervisor 210 coordinates operations carried out by the processors associated with the powered-on parent VM template 310 and child VM 311 and the associated applications 270. FIG. 7, described below, illustrates the sequence of the proactive and reactive phases, executed by the powered-on parent VM template 310 and the powered-on child VM 311.

At 602, a request is received by the powered-on child VM 311 to execute an application 270. At 604 the powered-on child VM 311 determines whether the pre-launched applications 270 are suspended within a container by the powered-on parent VM template 310. If the application 270 is determined to be not suspended within the container, it is launched by the powered-on child VM 311 at 606.

If the application 270 is determined to be suspended within the pre-launched container, the powered-on child VM 311 creates and/or requests a network security token for the suspended application from a virtual desktop interface (VDI) broker at 610. In some examples, the VDI broker creates a network security token for the user based on the identity of the user. In some examples, the network security token may incorporate user information such as the as machine name, Active Directory accounts, SID or Windows brand operating system GUID, or other operating system-specific identity.

The network security token is bound to the suspended application 270 at 612 to enable the user to open network files with the proper security context. For example, the network security token is bound to the application 270 by calling a new API to perform a local login and specify new credentials that define a valid network token using the identity of the user, and only used on a network (not illustrated). In some examples the network is a local network. In other examples the network is a remote network. Then, the existing (e.g., previously bound) network security token on the child VM 311 is replaced with the new network security token. The identity of the application 270 in the child VM 311 on the local machine is the local account of the user, and, on the network, the identity of the application 270 in the child VM 311 is defined by the newly bound network security token. In some examples, a new logon instance is created specifically for the network. The user retains local identity, and gets a new network identity associated with a new token.

At 614, execution of the suspended application 270 is resumed using the network security token. In some examples, the user is 'reconnected' to the existing disconnected session on the new powered-on child VM 311 using the local-user account and the VDI broker passes the actual name/password of the user, securely, between the user 108 and the network.

FIG. 7 is an example sequence of operations performed by the first and second VMs during the proactive and reactive phases of application launching. The left-hand column of FIG. 7 shows operations performed by the powered-on parent VM template 310 during the proactive phase. These operations are described in more detail in FIG. 5. The right-hand column of FIG. 7 shows operations performed by the child VM 311 during the reactive phase. The reactive phase is described in more detail in FIG. 6.

VMFork

VMFork keeps a parent VM locked in memory and allows a child VM to be created that initially shares its memory and disk blocks with the parent image. A copy-on-write (COW) mechanism is active for both memory and disk layers of such 'forked' children VMs, allowing for only changed memory pages and disk blocks to be preserved in association with a given child VM.

In the context of application publishing, VMFork shares the memory pages of a true desktop OS image along with applications running inside the parent VM. This 'one to many' memory page sharing helps the VM app-pub model to achieve parity or better with RDSH based approaches. Both models now effectively share the OS image across sessions but in different ways. RDSH co-locates application sessions inside a common OS whereas the VM model shares memory pages underneath multiple OS instances. If one or more applications are pre-launched in the VMFork parent VM, all application memory pages are shared across instances—something RDSH cannot achieve by itself.

Consider a VMFork parent VM optimized to deliver 'Viewer apps' to tablet users who want to view or make minor edits to their enterprise data-sync files but lack a native tablet app. A special document viewer prototype gives users the option to view such documents in a remote VM session. Such requests can be served from a VM that already has a set of application viewers launched in the VMFork parent VM. As multiple users consume instances of the various pre-launched application, memory pages between the multiple application instances are shared from the start. In contrast, in an RDSH model, multiple distinct copies of the same applications would be launched and at best share some common DLLs initially between the instances.

The memory sharing benefits of the VMFork based design can be extended using some special preparation methods. A special utility was written to full preload all application code pages into memory for each application launched in the parent VM. This is achieved, for example, by touching the first byte of each code page for each application that is pre-launched which forces them into memory and then locking the code pages into memory so the OS cannot page them out later on. By aggressively pre-staging all code pages into the parent VM, child VMs never needed to pull in code pages from disk and write them into memory. This approach reduces the Copy-On-Write memory activity among children, and saves on CPU and I/O associated with such code-page operations. Some examples see approximately a 10% CPU reduction and up to approximately 30% better memory consolidation over competing RDSH based approaches by preparing the VMFork parent VM in this manner.

The OS write-cache was turned off in the parent VM using a special registry or configuration setting in order to limit the tendency in the OS to use free memory for file caching. This allows assignment of more memory to the parent VM without the write-cache needlessly consuming extra memory in the child VMs.

To limit CPU consumption and application contention, a 'process suspend' command is used on all the pre-launched applications within the VMFork parent VM to ensure zero CPU consumption by all applications except the one chosen in the resulting child VMs. In some examples, only when a specific app is called for by a user will the target process be 'resumed' in the child VM. In some examples, the VDI broker, by way of its agent in the VM, may call a 'process resume' and then maximize the selected application.

Because the normal login process is bypassed, pre-launched applications are not initially running with the security context of any specific domain user. At the point an application is requested, aspects of the disclosure provide a way to modify the network security of the application so the user can open network files under their domain identity.

Different VM pools of desktops and application publishing can leverage VMFork. For the high memory sharing efficiency, some examples use a single VMFork parent for each host in a cluster. Pools of Child VMs based on each template can host a different OS or different set of applications.

VMFork maintains powered-on parent template VMs and a set of pre-registered but powered-off children VMs which cause a live 'Fork to occur when they are powered on or 'reset'. In these examples, children are pre-registered to VirtualCenter (VC) to remove registration from the critical path of deployment, and each pre-registered child VM has its own VMX file.

Upon request for a published application the children VMs are instantly powered on with unique Internet Protocol (IP) and/or media access control (MAC) addresses and quickly configured with 'finishing touches' for the application requested.

Aspects of the disclosure share memory pages across application publishing sessions without waiting for slower mechanisms like transparent page sharing to aid consolidation. Each fork event creates a VM that initially shares all pages with its parents and various configuration and tuning methods are used in the Parent VM to minimize subsequent copy-on-write activity. User activity creates a set of unique pages based on the level of activity within the cloned VM. For short-lived sessions focused on a single application, example testing shows approximately 55 MB of copy on write activity is generated on average. For 75 users, we observed approximately 15 GB of memory plus approximately 1 GB for the overhead of the parent VMFork machine that itself must stay locked in memory. By comparison, the same activity using examples of the traditional RDS technology described in the disclosure also generated approximately 16 GB of memory consumption.

Most CPU and I/O associated with session login, application launch, and logoff, are avoided in some examples of this VMFork based design. The login process was avoided because users were simply reconnecting to an existing disconnected session already running in the VMFork parent VM. Testing shows approximately 33% faster login times than equivalent activity on Horizon View 6 using RDS technology—16 seconds instead of approximately 24 seconds end to end. In typical application publishing designs, users must logoff RDSH when ending their session, generating spikes in CPU & I/O. The VMFork design described herein avoids logoff, calling a 'VM Reset' or 'power-off' to the hypervisor upon disconnect which serves to reset the non-persistent disk we assigned to the VM and also to either re-fork the VM so that it returns to a completely pristine state in a few seconds or to power off the VM completely. The CPU associated with this clone-reset or power-off is less than what is consumed in the typical logoff operation by RDSH technology.

VMFork based designs avoid the need to boot up the desktop for each session. New sessions can be initiated rapidly so that users get to their desired application quickly. Benefits of VM isolation are preserved, allowing 100% application software compatibility, a true desktop OS as opposed to a server based OS, and/or complete user isolation so there are no 'noisy-neighbor' performance problems often seen among RDSH solutions that cater to a diverse set of users and applications. The risk of an OS 'blue-screen' affecting multiple users is eliminated, and vSphere brand server virtualization platform has much better ability to govern the performance of each user individually. (vSphere is a trademark of VMware, Inc.).

Because a VMFork based design gives each application session its own VM, advanced VM features such as live migration, resource sharing, and more are brought to bear at the session level, something impossible to achieve with RDSH based designs. With regard to hybrid-cloud DaaS (Desktop as a Service), the ability to exert quality of service control over individual application sessions from within the platform is a strategic capability yet something obscured by placing multiple app-pub sessions inside a single VM.

Test Results

Example side-by-side tests were performed to compare application publishing sessions. The same physical VM server host was used in each test, a two socket 8 core machine with 48 GB of RAM. The host was equipped with a local sold-state drive (SSD) for fast I/O. Each test was allowed to run for about 30 minutes to ensure that steady-state results were observed.

Within each session, a random application was chosen from among three candidate applications—Excel brand spreadsheet application, Adobe Reader brand document viewing application, and PowerPoint brand presentation application. (Excel and PowerPoint are trademarks of Microsoft Corporation, and Adobe Reader is a trademark of Adobe Systems Incorporated). A defined View Planner brand comparison tool-based workload script executed within the application to simulate user actions, and then the session was concluded. (View Planner is a trademark of VMware, Inc.). After 30 seconds, a replacement session was spawned to keep or maintain the number of sessions at the target density throughout the test. This process of user-rotations and short 15 minute sessions was meant to simulate how users might use application remoting from their mobile devices for short term access to legacy applications or doc viewers.

In tests involving the current disclosure, the sessions were initiated against a single large VM running RDSH which was assigned 16vCPU so it could fully utilize the VM server host and 40 GB of memory. No other VMs were running on the VM server host. Upon login, a random application was launched, the scripted set of work activities completed, and the session was logged off.

For the VMFork test case, each VM instances of a parent VM template 310 were forked upfront. The child VMs 311 inherited a pre-logged in session with three applications already launched and minimized to the taskbar but in a suspended state. The 'process suspend' was used in the VMFork parent to minimize the idle CPU cycles across the pre-cloned pool and to reduce memory pages being touched by the idle applications. Upon login, the comparison tool reconnects to the existing session, resumes a random application from its suspended state and executes the workload script. Other pre-launched applications stayed suspended. The comparison tool technology enables connection to the existing session using a local account, bypassing the View broker entirely. Upon completion of the comparison tool workload, the VM is 'reset' in VirtualCenter brand information technology tool, which reverts the non-persistent disk to its initial state and re-forks the VM, ensuring that no artifacts of the prior session are left for the next session. (VirtualCenter is a trademark of VMware, Inc.).

Aspects of the disclosure are operable with guest customization methods allowing machine identity, Active Directory (AD) membership and key management server (KMS) licensing to be rapidly changed without a reboot following a VMFork event, facilitating rapid creation of VMFork based domain integrated desktops.

Figure 8:
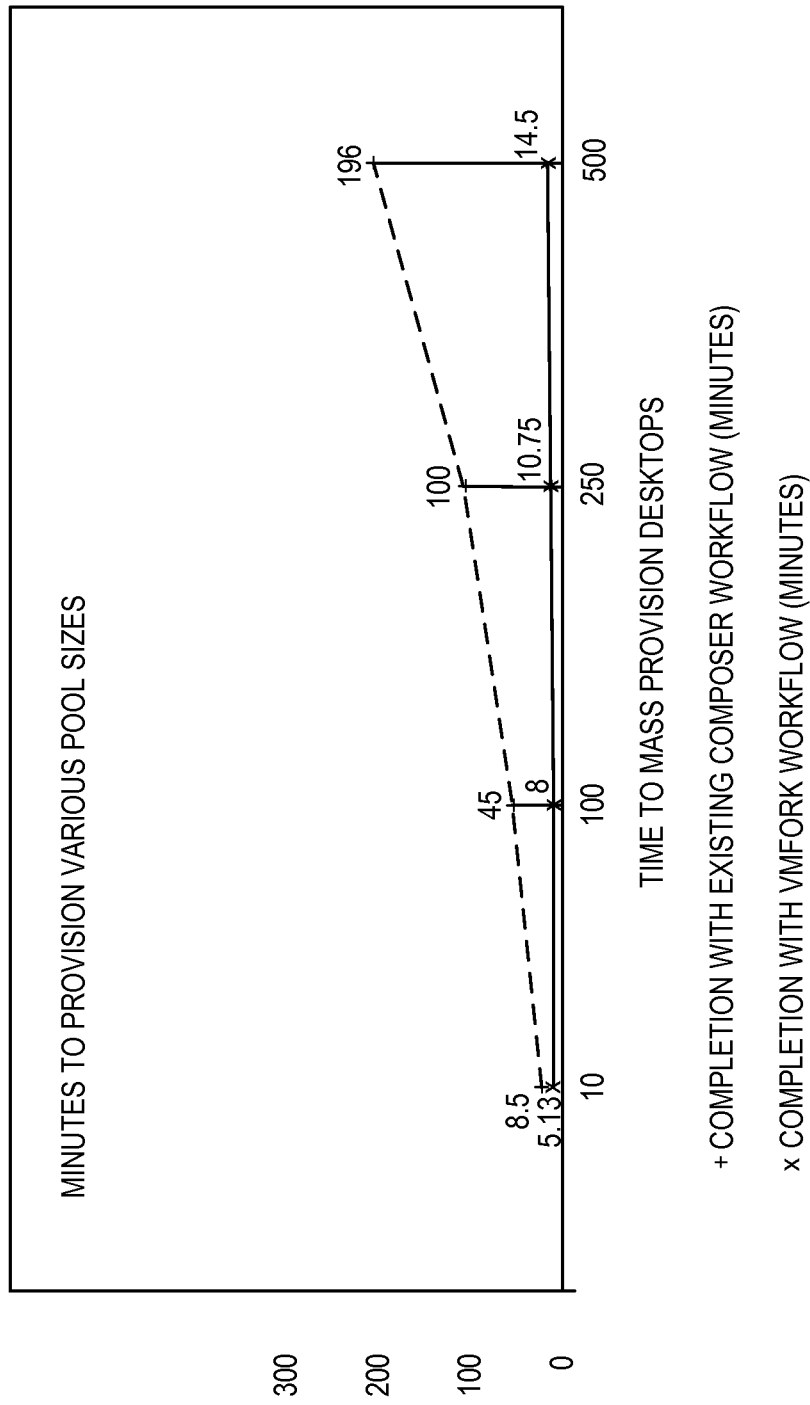
FIG. 8 is a chart illustrating a duration of provisioning various pool sizes of desktops using examples described in the present disclosure versus the existing methods.

The high speed of VMFork based cloning can be seen in FIG. 8. FIG. 8 compares the time to provision various pools of virtual desktops under an existing composer workflow method versus the disclosure. The X-axis is the number of desktops in the pool to be provisioned. The Y-axis is the time, in minutes, to provision the pool of virtual desktops. The existing method of provisioning virtual desktops is illustrated with the top dashed line, and the disclosed method is the bottom line. The test results on the graph indicate that for provisioning a small pool of ten virtual desktops the existing method takes approximately 8.5 minutes, and the disclosed method takes approximately 5.13 minutes. When a larger pool of one hundred desktops is provisioned, the existing method takes approximately 45 minutes, and the disclosed method takes approximately 8 minutes. At 250 virtual desktops, the existing method takes approximately 100 minutes, and the disclosed method provisions that pool in approximately 10.75 minutes. For a large pool of 500 virtual desktops, the disclosed method takes approximately 14.5 minutes, while the existing method takes approximately 196 minutes.

Some technologies allow rapid injection of select applications into the desktop by way of rapidly hot-mounting VMDK disks that contain application binaries. Upon VMDK mount operation, an agent in the OS detects the mount and performs seamless merging of application data using configuration settings (e.g., Windows Registry) and file system filter driver technology.

Additional Examples

Aspects of the disclosure reduce the amount of data processing on the host, increase the speed of the host and other devices, reduce an amount of data being transferred over a local area network (LAN) and/or a wide area network (WAN), improve the functioning of the host itself, use less memory, reduce power consumption (use of memory takes power), reduce processor load, reduce network bandwidth usage, improve operating system resource allocation, and/or increase efficiency.

Aspects of the disclosure further enable changing the network credentials of a process, thus allowing suspended applications to be resumed using a different user account (e.g., the requesting user). Some operating systems create a unique AuthenticationId for every logon to securely store the credentials used for the logon and associate them with the AuthenticationId. The AuthenticationId is also written into the Access Token that is assigned to processes and threads. When a network resource is accessed by a process, the operating system automatically provides the credentials associated with the AuthenticationId from the Access Token. A local account is used to log onto a system that is not a member of a Domain, although network resources can be accessed using domain credentials. It is possible to associate domain credentials to an AuthenticationId even if the system is not a member of a domain. To increase the memory sharing between multiple VMs and/or to decrease the time it takes to resume/start a new system, example operations are next described as part of creating the template image.

a) An administrator logs on to a computing device using a generic local user account.
b) Locally installed applications are started so that they are loaded into memory either manually or by automated scripts.
c) After the applications are loaded, the applications are suspended. Depending on the application requirements, each application may be suspended when is up and running, or when at a predetermined event happens, for example when the application call a specific API.
d) After the applications are suspended, the system is suspended and forked.
e) After a new VM instance has been created and resumed, the broker sends details of the user and the application to launch to an agent that runs on the desktop of the user.
f) The agent substitutes the network credentials associated with the access token that is assigned to the previously started application process (see (c) above).
g) The network credentials may be changed either by assigning an updated access token having a different AuthenticationId to the application process, or by changing the network credentials that are associated with the unique AuthenticationId from the interactive logon (see (a) above).
h) After the network credentials have been changed, the application is resumed.
i) The application continues to execute using the interactive credentials of the generic user account (see (b) above).
j) Any time the application is accessing a network resource, it uses the network credentials that were substituted at (g).

Aspects of the disclosure match or exceed RDSH resource efficiency, re-moving traditional objections based on resource consumption.

Aspects of the disclosure provide enhanced functionality such as better isolation and/or compatibility.

Aspects of the disclosure provide improved user experience such as execution stability, improved access latency, and customization for application needs.

Aspects of the disclosure provide platform based resource sharing that outperforms OS based sharing.

Aspects of the disclosure enable VMs to have improved performance over RDSH sessions.

Examples described herein are operable with any cloud service 302, such as those managing very large datasets (e.g., "big data"), those supporting virtual desktops, and those providing a cloud computing platform as a service or other cloud service provider (e.g., CLOUD FOUNDRY brand computer services). In part by creating and managing parent VM templates 310 as described herein and performing the forking routines, aspects of the disclosure are able to instantly provision (e.g., about under a second) these and other cloud services 302 with fully functional VMs 235 with low (e.g., minimal) processor overhead.

Example Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Example computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an example computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

The examples illustrated and described herein as well as examples not specifically described herein but within the scope of aspects of the disclosure constitute example means for performing application publishing with memory state sharing. For example, the elements illustrated in the figures, such as when encoded to perform the operations illustrated in the figures, constitute example means for pre-launching applications on a parent VM in response to a request for memory state sharing between the parent VM and the child VM, example means for locking the pre-launched application in memory, suspending the applications and parent VM, example means for forking the parent VM, example means for resuming the application on the child VM, and example means for assigning the resumed application a user-specific network security token.

At least a portion of the functionality of the various elements illustrated in the figures may be performed by other elements in the figures, or an entity (e.g., processor, web service, server, application program, computing device, etc.) not shown in the figures. While some of the examples are described with reference to products or services offered by VMware, Inc., aspects of the disclosure are operable with any form, type, origin, or provider of the products or services described.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system comprising:
    a memory area associated with a computing device, said memory area storing data shared among a plurality of virtual machines (VMs) including a parent VM and a child VM; and
    a processor programmed to:
        receive a request for memory state sharing between the parent VM and the child VM;
        lock one or more code pages associated with one or more applications into the memory area, such that the application code pages are resident in memory of the parent VM;
        suspend execution of the one or more applications on the parent VM; and
        suspend the parent VM, wherein the child VM selectively resumes execution of one or more particular applications of the one or more suspended applications on the child VM using the corresponding locked code pages.

2. The system of claim 1, wherein the processor is programmed to monitor the parent VM for a triggering event.

3. The system of claim 1, wherein the processor is programmed to pre-launch the one or more applications on the parent VM prior to locking the code pages associated with the one or more application into the memory area.

4. The system of claim 1, wherein the processor is programmed to bring the one or more code pages associated with the one or more applications into the memory area.

5. The system of claim 1, wherein the processor is programmed to fork the child VM from the parent VM.

6. The system of claim 1, wherein the processor is programmed to:
    halt an execution state associated with the parent VM; and
    mark memory pages in the parent VM as copy-on-write.

7. The system of claim 1, wherein the processor is programmed to configure the child VM with a redo log pointing to a disk of the parent VM as a base disk of the child VM.

8. The system of claim 1, wherein the processor is programmed to:
    receive a request to execute the one or more suspended applications;
    create a network security token for the one or more suspended applications based on an identity of a user;
    bind the network security token to the one or more suspended applications; and
    resume execution of the one or more suspended applications using the network security token.

9. The system of claim 1, wherein suspending execution of the one or more applications on the parent VM comprises suspending a corresponding process associated with each respective application of the one or more applications.

10. The system of claim 9, wherein resuming execution of a particular suspended application by the child VM comprises resuming the corresponding process associated with the particular suspended application.

11. The system of claim 1, wherein locking the one or more code pages associated with the one or more applications comprises pre-staging all code pages for each application of the one or more applications including touching the first bye of each code page for each application of the one or more applications to force them into memory.

12. The system of claim 1, wherein resuming execution of one or more of the suspended applications on the child VM is performed without pulling associated code pages from disk to be written into the memory area.

13. A method comprising:
receiving a request for memory state sharing between a parent VM and a child VM;
loading one or more code pages of one or more applications into memory;
locking the one or more code pages of the one or more applications into memory, such that the application code pages are resident in memory of the parent VM;
suspending execution of the one or more applications on the parent VM; and
suspending the parent VM, wherein the child VM selectively resumes execution of one or more particular applications of the one or more suspended applications on the child VM using the corresponding locked code pages.

14. The method of claim 13, wherein receiving a request comprises monitoring the parent VM for a triggering event.

15. The method of claim 13 further comprising disabling one or more services associated with the parent VM.

16. The method of claim 13 further comprising pre-launching the one or more applications on the parent VM prior to locking the code pages of the one or more applications into memory.

17. The method of claim 13 further comprising forking the child VM from the parent VM.

18. The method of claim 13 further comprising:
receiving a request to execute the one or more suspended applications;
creating a network security token for the one or more suspended applications based on an identity of a user;
binding the network security token to the one or more suspended applications; and
resuming execution of the one or more suspended applications using the network security token.

19. One or more non-transitory computer-readable storage media including computer-executable instructions that, when executed, cause one or more processors to:
enable memory state sharing among a plurality of virtual machines (VM) including a parent VM and a child VM; and
receive a request for memory state sharing between the parent VM and the child VM;
load one or more code pages of one or more applications into memory;
lock the one or more code pages of the one or more applications into memory, such that the application code pages are resident in memory of the parent VM;
suspend execution of the one or more applications on the parent VM; and
suspend the parent VM, wherein the child VM selectively resumes execution of one or more particular applications of the one or more suspended applications on the child VM using the corresponding locked code pages.

20. The one or more non-transitory computer-readable storage media of claim 19, wherein the computer-executable instructions, when executed, cause one or more processors to fork the child VM from the parent VM.

21. The one or more non-transitory computer-readable storage media of claim 19, wherein the computer-executable instructions, when executed, cause one or more processors to:
halt an execution state associated with the parent VM; and
mark memory pages in the parent VM as copy-on-write.

22. The one or more non-transitory computer-readable storage media of claim 19, wherein the computer-executable instructions, when executed, cause one or more processors to:
receive a request to execute the one or more suspended applications;
create a network security token for the one or more suspended applications based on an identity of a user;
bind the network security token to the one or more suspended applications; and
resume execution of the one or more suspended applications using the network security token.

* * * * *